T. M. HILL.
NUT LOCK.
APPLICATION FILED OCT. 14, 1920.

1,394,012.

Patented Oct. 18, 1921.

WITNESS:—
Chas. L. Griesbauer

Inventor
Theodore M. Hill,
By H. Ralph Burton,
Attorney

UNITED STATES PATENT OFFICE.

THEODORE M. HILL, OF SHUBERT, NEBRASKA.

NUT-LOCK.

1,394,012.  Specification of Letters Patent.  Patented Oct. 18, 1921.

Application filed October 14, 1920. Serial No. 416,924.

*To all whom it may concern:*

Be it known that I, THEODORE M. HILL, a citizen of the United States, residing at Shubert, in the county of Richardson and State of Nebraska, have invented certain new and useful Improvements in Nut-Locks, of which the following is a specification.

It is an object of this invention to provide simple and efficient means for preventing a nut from working off from or becoming loosened on a bolt.

With this object in view, the invention provides a nut-locking arrangement that can be adapted to practically all forms of nuts and bolts without deformation or alteration of the threaded portion of the bolt, and with little change in the nut.

When read in connection with the description herein, the details and characteristics of the invention will be apparent from the accompanying drawing, forming part hereof, wherein adaptations of the invention are disclosed, for purposes of illustration.

Like reference-characters refer to corresponding parts in the views of the drawings, of which—

Figure 1:
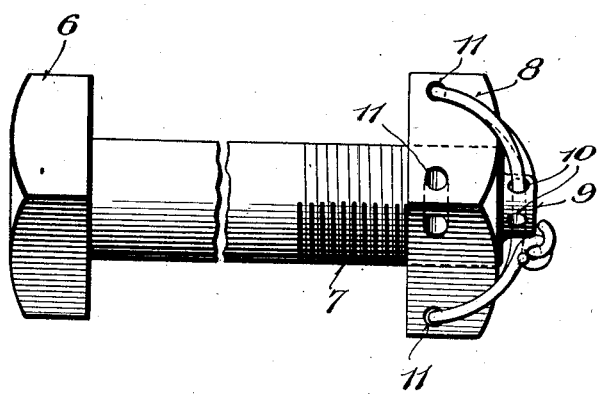
Figure 1 is a side view of a nut and bolt equipped with one form of the nut-lock.

Having more particular reference to the drawing, 6 designates a bolt having a shank 7 screw threaded on the end portion opposite to its head, on which a nut 8 is turnable in the usual manner.

In accordance with this invention, the nut and bolt are formed in such manner as to facilitate engagement therewith of pieces of stout bendable wire or the like for the purpose of locking the nut in place on the bolt and to prevent its working off.

Figure 2:
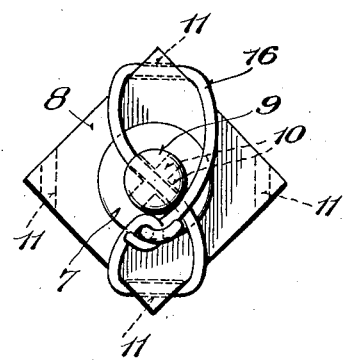
Fig. 2 is a view of the end of the bolt shown by Fig. 1.

In the form disclosed by Figs. 1 and 2, the bolt-shank has a terminal extension or protuberance 9, which is formed with transverse holes or passageways 10; and the nut is formed with holes or passageways 11 through its corner portions. The holes or passageways are to receive the wire or similar locking means.

Figure 3:
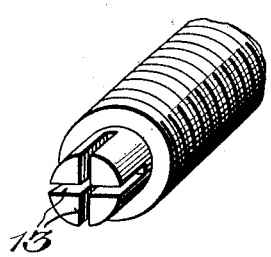
Fig. 3 is a fragmentary view of a bolt having a slotted end.

The bolt-shank terminal portion also may be formed with slots 13, as shown by Fig. 3, for the purpose of receiving the wire or similar locking means, instead of with holes or passageways.

Figure 4:
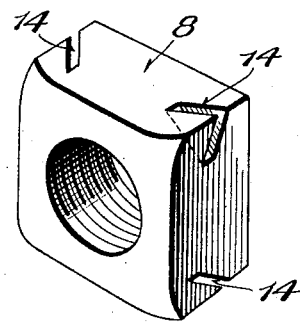
Fig. 4 is a view of a slotted nut.

The nut, instead of being formed with holes or passageways as shown by Figs. 1 and 2, may be formed with open passageways or slots 14 at the corners for the purpose of receiving the locking means, as shown by Fig. 4.

Figure 5:
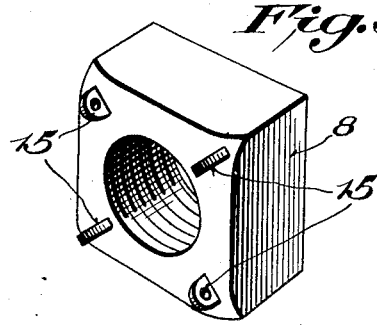
Fig. 5 is a view of a nut equipped with eyes.

The nut also may have eyes 15 on top at the corners, as shown by Fig. 5 which afford passageways to receive the locking means and which are of advantage when the nut is seated in a depressed surface where it is impracticable to reach holes or slots on the sides.

Nuts of any of the three forms disclosed may be used with either of the bolts disclosed. The nut and bolt in every case have seats, located as shown and described, for the purpose of receiving the locking means of wire or the like.

With an arrangement such as described, after a nut has been screwed home, a stout piece of bendable wire or the like 16 is passed through or into all or any of the holes, eyes, or slots of the nut, brought to loop form, and engaged with the holes or slots of the bolt-shank. The free ends of the locking piece then are twisted or otherwise fastened together and the material thereby drawn tight.

The length of the wire pieces or the like depends, of course, upon the distance between the nut when it is home and the end of the bolt-shank. The wire pieces or the like will prevent the nut from turning off from the bolt, no matter what the distance between the nut and the end of the bolt-shank. When it is desired to loosen or remove the nut, the wire pieces or the like are untwisted or cut and removed either from the end of the bolt-shank or from the nut or from both of them, when the nut is free to be turned on the shank.

The nut-lock provided by this invention does not involve the deformation of the bolt-threads or of any other parts that will result in interference with the efficiency, reliability, or facility of their function and operation. No tools, other than a pair of wire-cutting pliers, are required to affix and remove the locking means.

Having thus described my invention, what I claim as new, and desire to secure by Letters Patent, is—

A bolt having a reduced portion extending from an end of and smaller than its shank and a transverse hole extending through said reduced portion, said reduced portion being arranged to permit insertion in and removal from the hole of a nut-locking wire when the nut practically covers the hole.

In witness whereof, I affix my signature.

THEODORE M. HILL.